United States Patent [19]
Townsend

[11] 3,952,952
[45] Apr. 27, 1976

[54] BRAKE MEANS FOR AN AIR-POWERED SPRINKLER SYSTEM

[76] Inventor: Loren R. Townsend, Sidney, Nebr. 69162

[22] Filed: Jan. 10, 1975

[21] Appl. No.: 540,111

[52] U.S. Cl.................................. 239/177; 137/344; 188/170
[51] Int. Cl.² ........................................ B05B 3/12
[58] Field of Search ............ 239/177, 212; 137/344; 180/74; 188/74, 170

[56] References Cited
UNITED STATES PATENTS

| | | | |
|---|---|---|---|
| 1,794,461 | 3/1931 | Jackson | 188/170 |
| 3,386,661 | 6/1968 | Olson et al. | 137/344 X |
| 3,606,161 | 9/1971 | Paul | 137/344 X |
| 3,690,343 | 9/1972 | Crane | 137/344 |
| 3,766,937 | 10/1973 | Lundvall et al. | 239/212 X |
| 3,866,836 | 2/1975 | Dowd | 137/344 X |

*Primary Examiner*—Evon C. Blunk
*Assistant Examiner*—Michael Mar
*Attorney, Agent, or Firm*—Zarley, McKee, Thomte, Voorhees & Sease

[57] ABSTRACT

A brake for an air-powered sprinkler system for preventing the drive towers from rolling down inclines and for preventing the wind from rolling the drive towers. An overhead water supply pipe extends outwardly from the center pivot point and is supported by a plurality of spaced apart wheeled drive towers. An air-powered drive mechanism is provided on each of the towers to propel the towers and water supply pipe around the center pivot point. A control mechanism is provided on each of the towers for selectively operating the drive mechanism associated therewith to maintain the pipe and towers in an aligned condition as the water supply pipe is pivoted around the central pivot point. The control mechanism comprises a rotary cam plate having an alignment rod secured thereto which extends to the gimbal ring on a flexible joint positioned on the water supply pipe adjacent the tower. The rotary cam plate controls the operation of a hydraulic cylinder which is pivotally connected to a trojan bar mounted on the drive tower for reciprocating movement. The trojan bar is provided with downwardly extendings dogs on its opposite ends which engage the drive wheels to rotate the same on actuation of the hydraulic cylinder. A brake is mounted on the drive tower and is urged into engagement with the inside of the drive wheel rim by a spring means to prevent undesirable rotation of the drive wheel. An air cyclinder is operatively connected to the brake to move the brake out of frictional engagement with the drive wheel rim as the trojan bar is driving the drive wheels.

11 Claims, 5 Drawing Figures

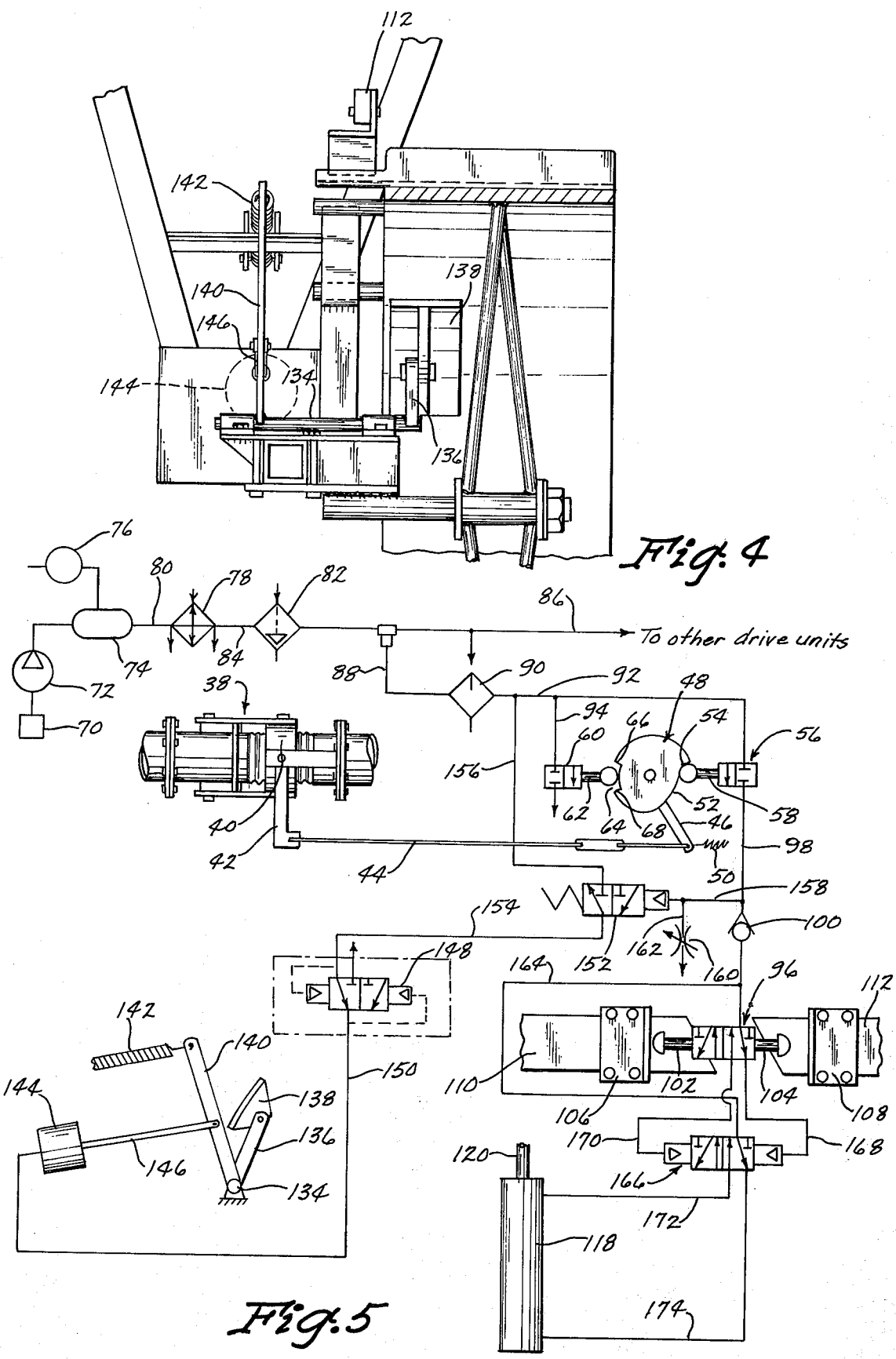

3,952,952

BRAKE MEANS FOR AN AIR-POWERED SPRINKLER SYSTEM

BACKGROUND OF THE INVENTION

This invention relates to an air-powered sprinkler system and more particularly to a brake means for an air-powered sprinkler system.

Air-powered sprinkler systems such as those disclosed in U.S. Pat. No. 3,606,161 are employed to irrigate large areas of land around a center pivot. A plurality of drive towers are provided along the length of the overhead water supply pipe to propel the supply pipe around the center pivot.

In air-powered sprinkler systems such as that disclosed in U.S. Pat. No. 3,606,161, and the system disclosed in the patent application filed concurrently herewith entitled AN AIR-POWERED SPRINKLER SYSTEM, a problem arises in that the towers tend to roll down steep inclines thereby becoming out of alignment with the other towers. Frequently, wind will also undesirably move the water supply pipe and drive towers due to the force of the wind acting thereagainst.

Therefore, it is a principal object of the invention to provide a brake means for an air-powered sprinkler system.

A further object of the invention is to provide an air-powered sprinkler system and brake means therefore which prevents the drive towers from rolling down inclines.

A further object of the invention is to provide a brake means for an air-powered sprinkler system which prevents the associated drive tower from moving unless the drive hydraulic cylinder is moving through its drive stroke.

A further object of the invention is to provide a brake means for an air-powered sprinkler system which may be employed on the intermediate drive units or towers of the sprinkler system.

A further object of the invention is to provide a brake means for an air-powered sprinkler system which is economical of manufacture, durable in use and refined in appearance.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

FIG. 4 is a sectional view of the drive wheel and brake mechanism as seen on lines 4 — 4 of FIG. 3; and FIG. 5 is a schematic of the circuitry for controlling the operation of the brake means.

DESCRIPTION OF THE PREFERRED EMBODIMENT

Figure 1:
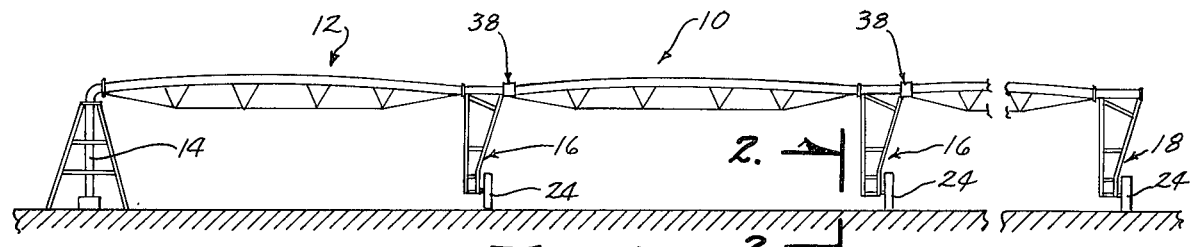
FIG. 1 is a partial side view of an air-powered sprinkler system.

The numeral 10 refers generally to an air powered sprinkler system such as generally disclosed in U.S. Pat. No. 3,606,161 which issued Sept. 20, 1971 and the air-powered sprinkler system disclosed in the patent application filed concurrently herewith entitled AN AIR-POWERED SPRINKLER SYSTEM. Reliance on the concurrently filed application is made herewith to complete this disclosure if necessary.

Sprinkling apparatus 10 generally includes a water supply pipe 12 extending outwardly from a center pivot point 14 which is in communication with a source of water under pressure. The pipe 12 is comprised of a plurality of tubular sections suitably connected together in an end-to-end relationship and supported by a plurality of intermediate towers 16 and a lead tower 18. The brake means disclosed herein is designed to be mounted on those intermediate towers 16 which require the same. In some installations, it will not be necessary to provide a brake means on all of the intermediate towers 16. The brake means of this invention would not normally be mounted on the lead drive unit 18 since the lead drive unit or tower ordinarily does not include an alignment means.

Each of the towers 16 generally comprises a horizontally disposed frame member 20 having drive wheels 22 and 24 rotatably mounted at the opposite ends thereof as illustrated in the drawings. Wheels 22 and 24 are provided with a plurality of driving lugs 26 and 28 mounted on the periphery thereof respectively. As seen in the drawings, the driving lugs extend laterally from the wheels.

Frame members 30 and 32 are secured at their lower ends to frame member 20 and extend upwardly therefrom in a diverging relationship. Likewise, frame members 34 and 36 are secured to frame member 20 and extend upwardly therefrom in a diverging relationship. The upper ends of the frame members 30, 32, 34 and 36 are operatively connected to the water supply pipe for supporting the same in conventional fashion.

For purposes of description, the numeral 38 refers to a flexible joint provided on the water supply pipe 12 adjacent the intermediate towers 16 for permitting angular movement between the tubular sections about horizontal and vertical axes. Joint 38 generally comprises a gimbal ring 40 which is pivotally connected to spaced apart arms operatively connected to the ends of the adjacent tubular members. An alignment arm 42 is rigidly secured to the gimbal ring 40 and extends horizontally outwardly therefrom. One end of an alignment rod 44 is connected to the outer end of alignment arm 42 and is connected at its other end to an arm 46 extending from a rotary alignment cam 48 provided on the drive tower. Spring 50 normally urges the alignment cam 48 in a counter-clockwise direction as viewed in FIG. 5 and resists the clockwise rotation of the alignment cam 48. Alignment cam 48 is provided with a cam surface 52 formed in the periphery thereof having a shoulder 54 at one end thereof. The numeral 56 refers to a normally closed alignment valve having a plunger 58 extending therefrom which is adapted to be engaged by the shoulder 54 to open the alignment valve 56 upon the alignment cam 48 being sufficiently rotated. The numeral 60 refers to a safety valve which is exhaustable to the atmosphere and which has a plunger 62 extending therefrom as illustrated in FIG. 5. The outer end of the plunger 62 is normally received by the notch 64 formed in the periphery of alignment cam 48 and defined by shoulders 66 and 68. Safety valve 60 is normally closed but is opened to the atmosphere upon the plunger 62 being moved inwardly into the valve 60 by the shoulders 66 or 68.

The numeral 70 refers to a power source such as an electric motor or gasoline engine which is connected to an air compressor 72 which supplies air under pressure to a surge tank 74. A high-low pressure switch 76 of conventional design is connected to the surge tank 74 and is adapted to de-activate the power source 70 if the pressure should objectionably drop within surge tank 74 or if the pressure should objectionably rise in surge tank 74. Surge tank 74 is operatively connected to a cooling apparatus 78 by line 80. The compressed air is furnished from the cooling apparatus 78 to a filter 82 through a line 84. Air line 86 extends from the filter 82 and would extend to the drive towers along the length of the sprinkling system. At each of the intermediate towers, a line 88 extends from the line 86 to a lubricator 90 mounted on the drive tower. Lubricator 90 has an air line 92 extending therefrom which is connected to the inlet side of the alignment valve 56 as illustrated in FIG. 5. Line 94 connects the inlet end of safety valve 60 with the line 92 as also illustrated in FIG. 5.

Figure 2:
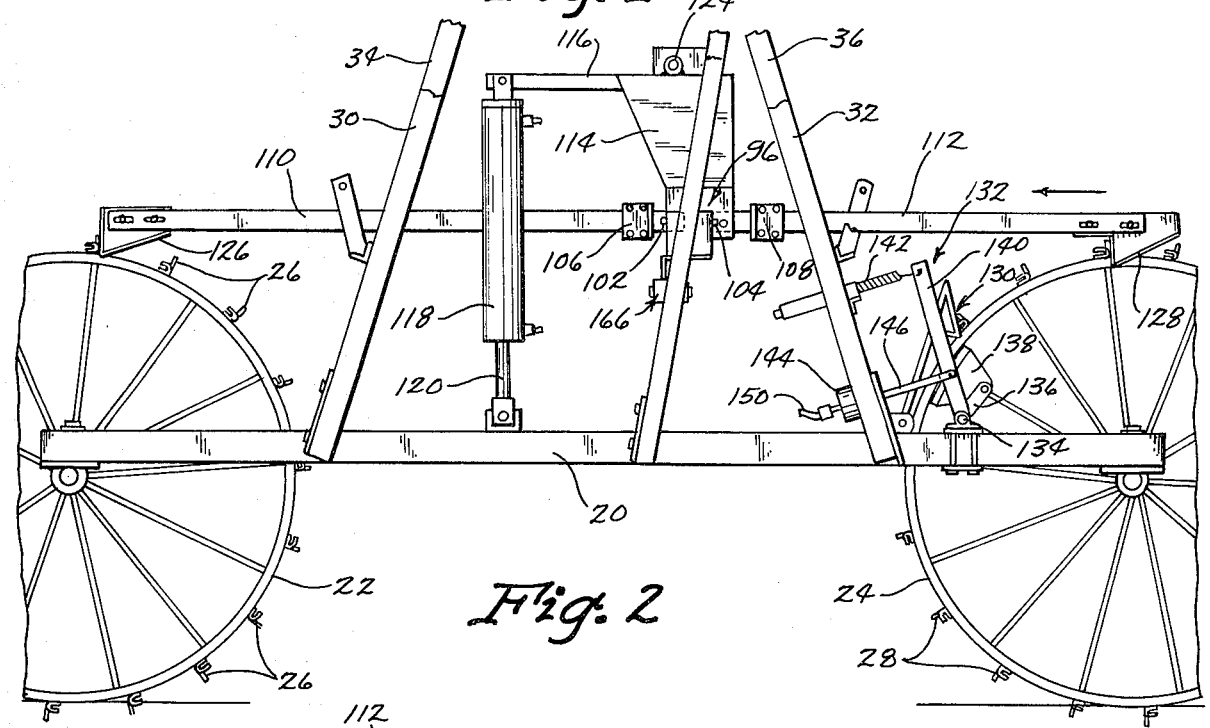
FIG. 2 is a partial side view of a drive tower of the sprinkler system as seen on lines 2 — 2 of FIG. 1.
Figure 3:
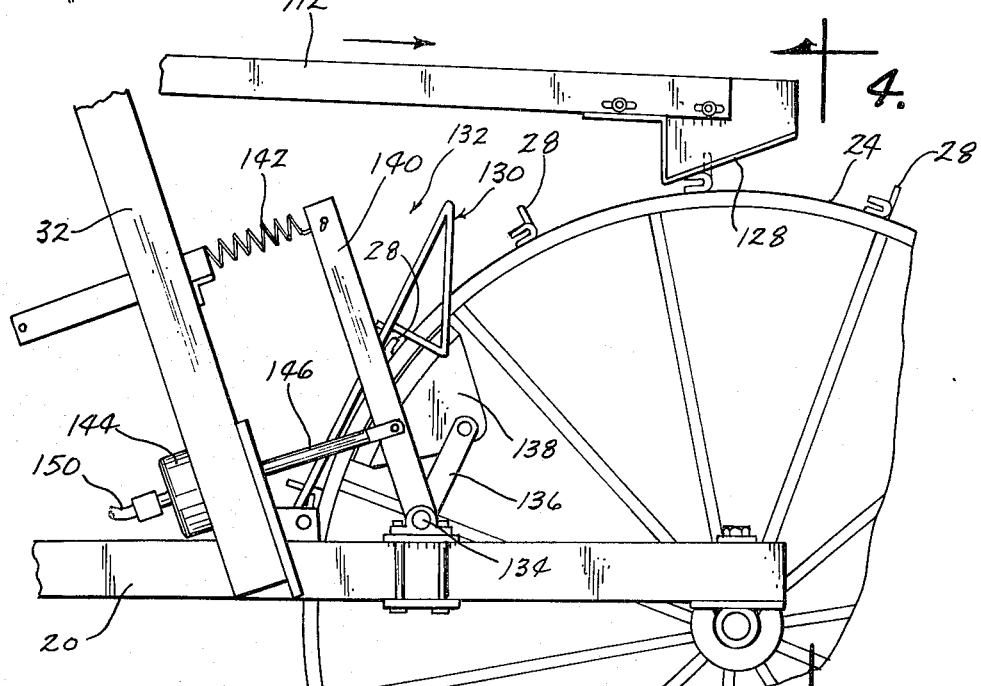
FIG. 3 is a partial side view of a drive wheel and the brake mechanism associated therewith.

The numeral 96 refers to a four-way valve which is connected to the discharge side of alignment valve 56 by line 98. The numeral 100 refers to a check valve imposed in the line 98 as illustrated in FIG. 5. As stated, valve 96 is a four-way valve and is mounted on the drive tower so that its plungers 102 and 104 will be engaged by the brackets 106 and 108 mounted on the trojan bars 110 and 112 respectively. The inner ends of trojan bars 110 and 112 are pivotally connected to the lower end of a plate 114 which is pivotally mounted on the frame means and which has an arm 116 extending therefrom as illustrated in FIG. 2. The base end of an air cylinder 118 is pivotally connected to the outer end of arm 116 and extends downwardly therefrom towards frame member 20. The outer end of rod 120 is pivotally connected to the frame member 20 by any convenient means. Thus, actuation of the air cylinder 118 causes the plate 114 to pivot about 124 so that the trojan bars 110 and 112 are reciprocated longitudinally. Dogs 126 and 128 extend downwardly from the outer ends of trojan bars 110 and 112 and are adapted to engage the lugs 26 and 28 on the wheels 22 and 24 respectively to cause the wheels 22 and 24 to be rotated in a counter-clockwise direction as viewed in FIG. 2 as the rod 120 is extended from the cylinder 118. The extension of the rod 120 from the cylinder 118 may be termed the drive stroke while the retraction of the rod 120 into the cylinder 118 may be referred to as the return stroke. During the return stroke, the dogs 126 and 128 simply pass over the lugs 26 and 28.

The numeral 130 refers to a pivotal arm means which is adapted to engage the lugs 28 on the wheel 24 to prevent the wheel 24 from rotating in a clockwise direction as viewed in FIG. 2 during the return stroke of the cylinder 118. Thus, without some form of brake means, the drive tower would be free to move to the left as viewed in FIG. 2 if the drive tower was traveling down an incline or if sufficient wind force was being exerted on the tower from the right hand side of FIG. 2. The brake means of this invention is referred to generally by the reference numeral 132 and generally comprises a shaft 134 which is rotatably mounted on the frame member adjacent wheel 24. Arm 136 is rigidly secured to one end of shaft 134 and extends upwardly therefrom. Brake shoe 138 is pivotally secured to the upper end of arm 136 and is adapted to engage the inside surface of the rim portion of the wheel 24 as seen in the drawings. Arm 140 is rigidly secured at its lower end to shaft 134 and also extends upwardly therefrom. Spring 142 is connected at one of its ends to the upper end of arm 140 and is connected at its other end to the tower or frame members thereof to normally urge the brake shoe 138 into engagement with the inside surface of the rim portion of the wheel 24. Preferably, spring 142 is adjustably mounted on the tower or frame means thereof so that the amount of braking pressure applied to the wheel can be selectively adjusted.

An air cylinder 144 is also mounted on the tower or frame members thereof and has a length adjustable rod 146 extending therefrom. Rod 146 is normally in a retracted condition but is moved to an extended position upon the cylinder 144 being activated so that the brake shoe 138 is moved out of engagement with the wheel 24 to permit the wheel 24 to be rotated as desired.

Cylinder 144 is connected to a quick-exhaust valve 148 by line 150. Valve 148 is connected to a three-way valve 152 by line 154 as depicted in FIG. 5. Valve 152 is connected to line 92 by means of lines 156 so that system pressure is applied to the valve 152 when system pressure is present in line 92. Line 158 connects valve 152 with the line 98 between the check valve 100 and the alignment valve 56. The numeral 160 refers to a needle valve which is connected to line 158 by line 162. Line 164 connects line 98 with the four-way valve 166. As seen in FIG. 5, valve 166 is also connected to the valve 96 by lines 168 and 170 as illustrated in FIG. 5. Lines 172 and 174 connect the valve 166 with the opposite ends of the air cylinder 118.

The normal method of operation is as follows. Power unit 70 powers the air compressor 72 which supplies compressed air to the surge tank 74 which in turn supplies the air to line 86 through the cooling apparatus and filter. Line 86 supplies air under pressure to all of the drive towers and the operation of a single tower will be described. As previously stated, alignment valve 56 is normally closed but would be opened upon the tower moving out of alignment with the next adjacent tower. The alignment arm 42 causes the alignment rod 44 to rotate alignment cam 48 in a clockwise direction (FIG. 5) so that alignment valve 56 is opened to supply system pressure to valve 96 and to valve 152 which causes the valve 152 to open so that system pressure is supplied to the valve 148 through the lines 156 and 154. Prior to valve 152 opening to permit system pressure to be supplied to the valve 148, the air cylinder 144 is not activated or pressurized so that spring 142 maintains the brake shoe 138 in frictional engagement with the wheel 24 to prevent the tower from moving. As soon as system pressure is supplied to the valve 148 by the opening of the alignment valve 56, the brake shoe 138 is moved out of engagement with the drive wheel to permit the drive wheel to be rotated. The air supplied to valve 96 causes the cylinder 118 to be activated so that the trojan bars 110 and 112 are moved to the left as viewed in FIG. 2 so that the drive wheels 22 and 24 are rotated in a counter-clockwise direction.

As the alignment valve 56 is closed by the tower moving into alignment, the system pressure between the three-way valve 152, check valve 100 and the alignment valve 56 is bled off through the needle valve 160. As the pressure is bled off, the three-way valve 152 shifts to its normally closed position thereby exhausting the pressure in line 154, causing the quick-exhaust valve 148 to dump the pressure from cylinder 144 thereby allowing the spring 142 to reset the brake shoe 138 against the wheel rim. The quickness with which the brake shoe 138 is reset against the wheel rim is controlled by the amount of air that is allowed to bleed through the needle valve 160. The quickness of the brake shoe engaging the wheel rim is directly proportional to the amount of air which is allowed to bleed through the needle valve 160.

Thus it can be seen that the brake shoe 138 is held against the inside of the wheel rim by the spring 142 thereby preventing the tower from rolling ahead on steep slopes. Any time the system pressure is lost such as when the safety valve 60 shuts the system down due to misalignment or when the system is shut down by the operator, the brake shoe 138 engages the wheel rim thereby preventing the system from rolling down a steep grade or being rolled ahead by the wind.

Thus it can be seen that a novel brake means has been provided for the intermediate drive towers of a sprinkling system which accomplishes at least all of its stated objectives.

I claim:

1. A self-propelled sprinkling apparatus comprising, a water supply pipe moveable about a central pivot point, a plurality of spaced apart, wheeled drive towers supporting said supply pipe above the area to be sprinkled, an air operated drive means on each of said towers to propel said towers and said supply pipe about said central pivot point, a source of compressed air for supplying air under pressure to said drive means, control means on said towers for controlling the operation of said drive means so that said towers will be selectively driven to maintain said supply pipe in an aligned condition as said supply pipe is moved about said pivot point, each of said drive towers comprising at least a pair of wheels, and a brake means on at least one of said towers which selectively moves into braking engagement with at least one of said wheels on said one tower to prevent the said tower from undesirable rolling, said tower comprising a frame means having the said pair of wheels mounted thereon, a trojan bar means reciprocatably mounted on said frame means and moveable between first and second positions for engagement with at least one of said wheels for driving said wheel when said trojan bar means moves in at least one direction, said drive means including a drive air cylinder operatively connected to said trojan bar means for reciprocating said trojan bar means, said brake means comprising a brake shoe normally yieldably maintained in frictional engagement with said one wheel, and brake release means for selectively moving said brake shoe out of frictional engagement with said one wheel when said trojan bar means is moving in at least said one direction.

2. The apparatus of claim 1 wherein said brake release means comprises a second air cylinder on said frame means and having a rod movably extending therefrom which is operatively connected to said brake shoe for moving said brake shoe out of frictional engagement with said one wheel when said air cylinder is pressurized, and means for pressurizing said second air cylinder when said tower is being driven by said trojan bar means.

3. The apparatus of claim 2 wherein said control means comprises a valve means connected to said source of air pressure and having a pair of opposing valve plungers extending therefrom, said trojan bar means having first and second elements thereon adapted to alternately engage said plungers respectively upon said trojan bar means being moved between its said first and second positions by said drive air cylinder, a normally closed alignment valve mounted on said tower, said alignment valve having its inlet end connected to the source of air pressure and its outlet end connected to said valve means, and alignment control means mounted on said tower for opening said alignment valve when said tower moves out of predetermined alignment with an adjacent tower so that said drive air cylinder will be operated to move said tower into alignment, said brake release means comprising a normally closed second valve means having its inlet end connected to said source of air pressure and its outlet end connected to said second air cylinder, said second valve means being connected to the outlet side of said alignment valve so that said second valve will be opened upon said alignment valve being opened.

4. The apparatus of claim 3 wherein a quick exhaust valve is provided in the air connection between said second valve and said second air cylinder for exhausting the air from said second air cylinder upon said second valve moving from its open to closed positions.

5. The apparatus of claim 2 wherein said control means comprises a normally closed alignment valve mounted on said tower having its inlet end connected to the source of said air pressure and its outlet end operatively connected to said drive air cylinder, and alignment control means mounted on said tower for opening said alignment valve when said tower moves out of predetermined alignment with an adjacent tower so that said drive air cylinder will be operated to move said tower into alignment, said brake release means comprising a normally closed second valve means having its inlet end connected to said source of air pressure and its outlet end connected to said second air cylinder, said second valve means being connected to the outlet side of said alignment valve so that said second valve will be opened upon said alignment valve being opened.

6. The apparatus of claim 5 wherein a quick exhaust valve is provided in the air connection between said second valve and said second air cylinder for exhausting the air from said second air cylinder upon said second valve moving from its open to closed positions.

7. A self-propelled sprinkling apparatus comprising, a water supply pipe moveable about a central pivot point, a plurality of spaced apart, wheeled drive towers supporting said supply pipe above the area to be sprinkled, an air operated drive means on each of said towers to propel said towers and said supply pipe about said central pivot point, a source of compressed air for supplying air under pressure to said drive means, control means on said towers for controlling the operation of said drive means so that said towers will be selectively driven to maintain said supply pipe in an aligned condition as said supply pipe is moved about said control pivot point, each of said drive towers comprising at least a pair of wheels, and a brake means on at least one of said towers which selectively moves into braking engagement with at least one of said wheels on said one tower to prevent the said tower from undesirable rolling, said tower comprising a frame means, said brake means comprising a shaft rotatably mounted on said frame means, a first arm rigidly secured to said shaft and extending therefrom, a brake shoe mounted on said first arm adapted to move into engagement with said one wheel to prevent rotational movement of said wheel when in engagement therewith, a second arm rigidly secured to said shaft and extending therefrom, a spring means connected to said second arm to yieldably urge said brake shoe into engagement with said wheel, and an air cylinder connected to said second arm against the yieldable force of said spring and to disengage said brake shoe from said wheel when said air cylinder is actuated.

8. The apparatus of claim 7 wherein said spring means has means thereon for adjusting the tension thereof.

9. The apparatus of claim 7 and means for pressurizing said air cylinder when said tower is being driven by said drive means.

10. The apparatus of claim 7 wherein said tower comprises a frame means having the said pair of wheels mounted thereon, a trojan bar means reciprocatably mounted on said frame means and movable between first and second positions for engagement with at least one of said wheels for driving said wheel when said trojan bar means moves in at least one direction, said air cylinder moves said brake shoe out of engagement with said wheel when said trojan bar means is moving in at least said one direction.

11. A self-propelled sprinkling apparatus comprising, a water supply pipe movable about a central pivot point, a plurality of spaced-apart, wheeled drive towers supporting said supply pipe above the area to be sprinkled, an air operated drive means on each of said towers to propel said towers and said supply pipe about said central pivot point, a source of compressed air for supplying air under pressure to said drive means, control means on said towers for controlling the operation of said drive means so that towers will be selectively driven to maintain said supply pipe in an aligned condition as said supply pipe is moved about said pivot point, each of said drive towers comprising at least a pair of wheels, and a brake means on at least one of said towers which selectively moves into braking engagement with at least one of said wheels on said one tower to prevent the said tower from undesirable rolling in either a forward or rearward direction, said tower comprising a frame means having the said pair of wheels mounted thereon, a trojan bar means reciprocatably mounted on said frame means and moveable between first and second positions for engagement with at least one of said wheels for driving said wheel when said trojan bar means moves in at least one direction, said drive means including means operatively connected to said trojan bar means for reciprocating said trojan bar means, said brake means comprising means normally yieldably maintained in frictional engagement with said one wheel, and brake release means for selectively moving said brake means out of engagement with said one wheel when said trojan bar means is moving in at least said one direction.

* * * * *